(12) United States Patent
Karandikar et al.

(10) Patent No.: US 8,311,127 B2
(45) Date of Patent: Nov. 13, 2012

(54) METHOD AND APPARATUS TO CHECK FOR WRONGLY DECODED MACROBLOCKS IN STREAMING MULTIMEDIA APPLICATIONS

(75) Inventors: Pravin Gangadhar Karandikar, Pune (IN); Shantanu Nath, Pune (IN); Vinayak Jayaram Pore, Pune (IN); Jaya Shrikrishna Panvalkar, Pune (IN); Parag Chaurasia, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 1500 days.

(21) Appl. No.: 11/067,853

(22) Filed: Feb. 28, 2005

(65) Prior Publication Data

US 2005/0195903 A1 Sep. 8, 2005

Related U.S. Application Data

(60) Provisional application No. 60/550,174, filed on Mar. 4, 2004.

(51) Int. Cl.
*H04N 7/12* (2006.01)

(52) U.S. Cl. .............. 375/240.27; 375/240.29; 382/239; 714/746

(58) Field of Classification Search ............. 375/240.27, 375/29, 240.29; 382/239; 714/746
See application file for complete search history.

(56) References Cited

U.S. PATENT DOCUMENTS

| | | | |
|---|---|---|---|
| 5,570,199 A * | 10/1996 | Tanaka et al. | 386/95 |
| 5,809,041 A * | 9/1998 | Shikakura et al. | 714/747 |
| 6,029,265 A * | 2/2000 | Itoi et al. | 714/755 |
| 6,040,879 A | 3/2000 | Park | 348/845.1 |
| 6,128,339 A | 10/2000 | Park | 375/240 |
| 6,381,282 B1 | 4/2002 | Kwan et al. | 375/240.27 |
| 6,449,311 B1 | 9/2002 | Ozcelik et al. | 375/240.16 |
| 6,456,664 B1 * | 9/2002 | Matsumura et al. | 375/240.27 |
| 6,512,759 B1 | 1/2003 | Hashimoto et al. | 370/347 |
| 6,512,795 B1 * | 1/2003 | Zhang et al. | 375/240.27 |
| 6,594,790 B1 * | 7/2003 | Sato et al. | 714/746 |
| 6,700,934 B2 | 3/2004 | Lin | 375/240.16 |
| 6,704,363 B1 | 3/2004 | Kim | 375/240.27 |
| 2002/0141502 A1 | 10/2002 | Lin et al. | 375/240.27 |
| 2003/0035487 A1* | 2/2003 | Chan | 375/240.27 |
| 2003/0123740 A1* | 7/2003 | Mukherjee | 382/239 |

OTHER PUBLICATIONS

Tsekeridou, S. et al., "MPEG-2 Error Concealment Based on Block-Matching Principles," IEEE Transactions on Circuits and Systems for Video Technology, vol. 10, Issue 4, Jun. 2000, pp. 646-658.

* cited by examiner

*Primary Examiner* — Sath V Perungavoor
*Assistant Examiner* — James Pontius
(74) *Attorney, Agent, or Firm* — Zilka-Kotab, PC (57) ABSTRACT

A method to detect (identify) wrongly decoded data (I type macro-blocks), which can be subsequently concealed by error concealment techniques, thereby improving the visual quality of a decoded stream, is provided. Additionally, a method is provided. In use, a set of macro-block data is selected for validation. Additionally, a set of suspicious macro blocks is selected from the set of macro-block data based on location information for each suspicious macro block.

13 Claims, 5 Drawing Sheets

METHOD AND APPARATUS TO CHECK FOR WRONGLY DECODED MACROBLOCKS IN STREAMING MULTIMEDIA APPLICATIONS

This application is based on provisional Application Ser. No. 60/550,174 filed Mar. 4, 2004.

FIELD OF THE INVENTION

The invention relates to the field of digital video decoding.

Particularly, the invention relates to a process of identifying defective data from an erroneous bit stream, so that a known error concealment technique can be applied to the defective data, so as to generate video data with minimal visual distortions and apparatus therefore.

DESCRIPTION OF PRIOR ART

A video decoder is sometimes be required to decode erroneous data typically because of an error prone channel. In such cases due to random error patterns, the decoder may misunderstand ('wrongly decode') the data, which may result in visibly annoying patterns in decoded output stream.

A principal object of the present invention is to provide a method to detect (identify) wrongly decoded data, which can be subsequently concealed by known error concealment means, thereby improving the visual quality of decoded stream.

Block based hybrid video coding methods are well known in the art. Examples include recommendations H263, H264 of the Telecommunication Standardization Sector of International Telecommunication Union (ITU-T) and standards, which are developed by Moving Picture Experts Group (MPEG) like MPEG-2 and MPEG-4. This invention is particularly directed to the process of digital video decoding in Block based hybrid video coding methods.

In hybrid-coding methods, frames of a video are divided into 16×16 groups of pixels to form 'macro-blocks'. Each macro-block is further sub-divided typically, into 4 sets of 8×8 groups of data called 'blocks'. In the case of Intra frame coding, each block is coded by utilizing its spatial correlation only. The spatial domain prediction is followed by texture transformation and quantization. In the case of Inter frame coding, temporal correlation is utilized by means of motion estimation followed by error transformation and quantization. Based on statistical occurrence of various encoded parameters, variable length coding results in entropy coding.

When such coded data is transmitted over say a mobile channel, various factors like fluctuating power of the signal, channel fading, signal interference, packet loss which affects the transmission medium introduce transmission errors in the bit stream. Different mechanisms of channel coding help to reduce this error, however 100% reduction is not possible because of the tradeoff involved in channel coding overheads. Also when an Internet Provider based network is involved, the packet losses are sometimes inevitable which are beyond the scope of channel coding techniques.

In general, one cannot guarantee that the bit streams received at the decoder side are error free. To cater to these errors, there is a need for some kind of error resiliency in the decoder. This problem is well understood by standardizing committees, and they have provided various error resiliency features for encoding bit streams. Data Partitioning, Support for Resynch Markers, Reversible Variable Length Codes (VLC) s features provided in MPEG-4 are examples of error resiliency techniques, which help the encoder to make bit streams more error resilient. However, it is well understood in the state of the art that while these features help localize the effect error, they do not avoid error completely.

Errors prevalent in the bit stream, result in the loss of partial or a full frame of data. In the event that this lost data region in the frame is un-initialized, 'green patches' result in the displayed output frames, which are visually very annoying.

Therefore in the prior art various error concealment techniques have been suggested, which find optimal match in the lost data regions:

U.S. Pat. Nos. 6,512,795 and 6,704,363, for instance, provide a technique in which missing data is predicted from earlier frame.

Again U.S. Pat. No. 6,449,311 discloses a method in which mission data prediction is performed adaptively from temporal or spatially available data.

U.S. Pat. No. 6,381,282, envisages a decoder, which requests re-transmission of encoded data via a feedback channel from encoder.

All of the aforesaid approaches have very limited scope. For instance, in U.S. Pat. No. 6,381,282, the scope is limited because of the unavailability of feedback channel in most scenarios, such as local playback.

Additionally, the error concealment means disclosed hereinabove do not help either in detecting miss-decoded macroblocks as explained herein below: Video Compression Standards use Variable Length Coding (VLC) to achieve data compression. Whenever an encoded video stream is transmitted via erroneous channel conditions, corruption of encoded video data takes place. A bit stream corruption may be misunderstood as completely different VLC values. In this case, a decoder will keep decoding until it finds a invalid VLC value. Hence in a normal operation, the decoder continues to decode data until it doesn't get a proper VLC value match for the incoming data stream. Subsequently, the decoder marks all the macro-blocks as LOST, which it is unable to decode. The decoder resynchronizes only after getting the start of the next video packet.

These macro-blocks, especially I macro-blocks [macroblocks which are independently coded without relying on any predictions from adjacent or neighboring macro-blocks] which are decoded without any temporal reference, are decoded by the decoder with wrong data and often cause appearance of prominent macro-blocks especially in I frames with no matching or correlation with the neighboring macroblocks. This degrades the quality of the video drastically. Such wrongly decoded macro-blocks not only affect the visual quality of a current video frame but also the visual quality of subsequent frames because of the predictive coding used for P type frames [which contain dependently coded macro-blocks relying on data from neighboring or adjacent blocks].

In prior art, error detection techniques help in detecting such wrongly decoded macro-blocks after which error concealment techniques are applied on them. Thus, for instance, U.S. Pat. No. 6,128,339 teaches a method of detection in which the Direct Current (DC) value differences within a macro-block are compared to a threshold. Disadvantage of this method is that it does not detect errors coming from the VLCs other than DC values. Thus for example errors in Alternating Current (AC) coefficients may give checkerboard pattern, which is visibly annoying.

Again, in U.S. Pat. No. 6,040,879, the Video stream syntax is limited to a h263 'baseline' profile only. As in the baseline profile, only 4 types of Macro-block type and the Coded Block Pattern for Chrominance (MCBPC) values are possible, which helps in catching the errors in only MCBPC values. A disadvantage of this method is that it limits the profile/features list of encoded stream. Thus, coding efficiency is hampered, as all tools cannot be used.

Still further, U.S. Publication No. 2002/0141502, the encoder is required to add additional information for each MB (which is standard compliant). A decoder, while decoding each Motion Vector (MV), verifies that information is correctly received. A disadvantage of such approach is that it will result in a slight degradation of the video quality as excessive bits are used for verification information. Also, a compliant encoder needs to be coupled with the decoder.

Alternatively, in U.S. Pat. No. 6,700,934, an Euclidean difference of motion vectors for all of the blocks of a macro-block is compared with a predefined threshold. Such a method is aggressive in marking a macro-block with large motion sequences as invalid. Another disadvantage in this method is that the possibility of errors being introduced in texture bits is not considered. For example, as texture data size is more than motion vector data, a probability of texture data getting corrupted is greater.

An object of the method in accordance with this invention is to overcome the disadvantages of disclosed in the prior art.

Another object of this invention is to provide a method, which reduces the complexity of error concealment by reducing the burden of checking all macro-blocks, and which prevents the risk of marking a correctly decoded macro-block as wrongly decoded to a great extent.

Yet another object of the invention is to provide a method, which considers dynamic variations of the system over all VLC values and does not restrict identification only to a specific set of VLC values.

Concomitantly, another object of the invention is that the 'detection means' does not restrict the encoder by any means say by limiting the profile and level of encoding video type and works for any type of block based video encoding technique.

Yet another object of the invention is that, the 'detection means' does not place any sort of constraints on the video encoder.

Still another object of the invention is that, the 'detection means' works in a robust manner for all types of video contents from slow motion, low detailed sequences to very high motion, high detailed sequences.

To meet these and other objects, the process and apparatus of this invention includes a selection means, which selects macro-blocks for detection. Further, the detecting involves comparing the continuity between the macro-blocks with an adaptive threshold.

SUMMARY OF THE INVENTION

The invention provides a method and apparatus for improving the visual quality of a video decoding system, the method consisting of providing a video decoder followed by an error concealment means. The encoded video bit stream is passed to the video decoder, which decodes the video bit stream to produce video frames. These video frames having possibly a few macro-blocks as LOST is fed to the 'detection means' where from all the decoded macro-block data, 'wrongly decoded' macro-block data is selectively identified and marked as LOST. The output frame with possibly a few LOST macro-blocks from the 'detection means' is passed onto a subsequent error concealment means where the erroneous macro-block data is concealed to generate error concealed video frames as an output of the system.

Thus the apparatus in accordance with this invention has two components the selection means, which selects the appropriate macro-block to which the method of detection of a wrongly decoded macro-block is to applied and a detection means, which deals with actually detecting a selected wrongly, decoded macro-block. It is a feature of this invention that it is applied only to the I macro-blocks as they are decoded on their own without any temporal reference and if they are wrongly decoded, video quality is affected very severely. The detailed detection of the selection and the detection means in accordance with this invention is provided herein below:

Selection Means

The selection means selects appropriate macro-blocks for application of the detection means. The major precaution, which has to be taken in applying detection for wrongly decoded macro-blocks, is that any correctly decoded macro-block should not be detected as wrongly decoded, otherwise this will further degrade the quality of the video. Hence in order to prevent detection of any correctly decoded macro-block as wrongly decoded following strategy has been adopted based upon observations.

It has been observed that if a macro-block is wrongly decoded, few subsequent macro-blocks are wrongly decoded and all subsequent macro-blocks are lost till the end of a packet is reached. The following set of rules is followed for selective application of detection logic. The macro-blocks satisfying any of the rules are subjected to application of detection logic.

By default, detection for wrongly decoded macro-blocks is applied to all macro-blocks, which are present at the end of the packets in the current frame, and which are decoded.

By default, detection for wrongly decoded macro-blocks is applied to all macro-blocks which precede any lost macro-block.

If the macro-block is found to be wrongly decoded, then the preceding macro-blocks are checked till the end of the previous packet is reached or a predefined number of macro-blocks are detected, else search for an end of the packet or a lost macro-block in the frame.

The aforementioned set of rules reduces the number of macro-blocks which should be considered for application of detection for wrongly decoded macro-blocks. Hence, it reduces the chance of considering a correctly decoded macro-block as being wrongly decoded after the application of detection for wrongly decoded macro-blocks. In accordance with a preferred embodiment of this invention, the predefined number of macro-blocks considered for application of detection logic is kept as 2.

Detection Means

In this means the threshold for detection of a macro block is decided based upon quantization parameters associated with the macro-block, which is to be considered for detection. If a macro-block is found to be wrongly decoded it is marked as LOST and proper Error Concealment technique is applied to recover the LOST macro-block data.

Here first the average absolute difference of the top row of pixel values of the current macro-block and the bottom row of pixel values of the top macro-block if present is found. Then average absolute difference of the bottom row of the current macro-block and the top row of the bottom macro-block if present is found. This comparison is first carried out as it is more probable that the top or bottom row of macro-blocks are correctly decoded and side macro-blocks are wrongly decoded or LOST.

If any of the top or bottom macro-blocks is not present or lost then first the average absolute difference of the right column of the current macro-block and the left column of the right macro-block if present is found else the average absolute difference of the left column of the current macro-block and the right column of the left macro-block if present is found. Then the individual average of the difference is compared with the threshold. If the average of the difference exceeds the evaluated threshold based on quantization parameters, the macro-block is detected as a wrongly decoded macro-block.

The threshold is decided as follows:

Threshold=MUL_FACT*quantization_Parameter of the macro-block which is to be considered for detection.

MUL_FACT is kept as 3. If the picture details ate very high MUL_FACT can be increased to 7.

Thus according to this invention there is provided a method of detection of error in video data which comprises decoded data stream in macro-block form, where the macro-blocks are confined by packet boundaries, and further the packets are confined by frame boundaries, said method consisting of, (a) Feeding the said decoded data stream to a 'selection means' for optimally selecting a set of macro-block data for validation and selecting a set of suspicious macro blocks there from based on their location information; and (b) Feeding the selected set of suspicious macro-blocks data to a detection means; and detecting in the detection means macro-blocks data with false coding, for onward feeding such macro-blocks data to an error concealment means.

Particularly in accordance with a preferred embodiment of this invention the step of selecting the set of macro-blocks data includes the steps of traversing the macro-block data in reverse zig zag order, and evaluating the traversed macro block data based on their location information relative to the location of current macro-block data with respect to its packet boundary and the location of the adjacently selected macro block data.

Typically, the step of selecting the set of macro-blocks data includes the step keeping a track of the count of consecutive macro-blocks being selected and terminating the selection process when the count reaches three.

In accordance with a preferred embodiment of this invention the step of detecting macro blocks with false coding includes evaluating the threshold parameter based on quantization value of a selected suspicious macro block data; searching of a neighboring valid macro-block data in vertical adjacent location followed by horizontal adjacent location, finding a continuity measure by taking into consideration at least two macro block boundaries by taking the sum of absolute difference in pixel data for current and adjacent macro-block data respectively, and comparing the respective pixel data on the boundaries of for deciding to mark macro-block data as LOST by comparing the continuity measure with the dynamic threshold.

Therefore the selection method in accordance with this invention comprises detection of wrongly decoded macro-blocks applied selectively taking into consideration the packet structure of video stream and the macro-blocks, which are LOST.

According to another aspect of this invention there is provided apparatus for carrying out the method disclosed above, said apparatus comprising (a) A selection means adapted to optimally select a set of macro-block data for validation and selecting a set of suspicious macro blocks there from based on their location information, said selection means consisting of receiver means adapted to receive decoded video frame data; traverser means adapted to traverse the macro-block data in reverse zig zag order; evaluator means adapted to select the macro-blocks based on their relative location information, generator means adapted to generating the refined set of suspicious macro-blocks and transmitter means adapted to transmit the selected suspicious macro block data;

(b) a detection means for detecting wrongly coded macro blocks consisting of a receiver means for receiving selected suspicious macro block data from the selection means; a threshold evaluator means adapted to evaluate the threshold parameters of the suspicious macro blocks date based on quantization value, Neighbor Difference Evaluator Means adapted to search neighboring valid macro-block data, and further adapted to find continuity measure by taking difference in pixel data for current and adjacent macro-block data, comparator means adapted to deciding the macro-block data as LOST by comparing the continuity measure with a dynamic threshold; and transmitter means is adapted to feeding the LOST macro-blocks to the error concealment means.

BRIEF DESCRIPTION OF THE DRAWINGS

The invention will now be described with reference to the accompanying drawings, and the associated description are provided to illustrate preferred embodiments of the invention and are not intended to limit the scope of the invention.

DETAILED DESCRIPTION OF THE PREFERRED EMBODIMENT

One embodiment of the invention is as shown in the accompanying drawings. Also details of specific embodiments and alternatives are given below, with the understanding that present disclosure is it to be considered exemplary and not intended to limit the ambit and the scope of the invention.

The main aspect of the invention is to identify 'wrongly decoded' macro-block data in a video frame containing errors. However if all macro-block data are suspected it will result in increasing the probability of forcing correctly decoded data to be marked as lost. Hence one aspect of invention deals with reducing the candidates for inspection and hence accelerate the overall process of error concealment.

The probability of a macro-block being a 'wrongly decoded' depends on few factors like placement of resynch marker in the bit-stream which segments the bit-stream into multiple video packets, the decoding status of the adjacent macro-blocks being LOST, the decoding status of the adjacent macro-blocks being identified as 'wrongly decoded' and also on decoding status of the adjacent macro-blocks being identified as not 'wrongly decoded'. Based on these inputs/cue the 'selection means' in accordance with this invention selectively chooses some macro-blocks for inspection.

The other aspect of the invention deals with macro-block selected by the 'selection means' as being wrongly decoded, and inspection of the selected macro block for possibility of being 'wrongly decoded'. It is intended in accordance with this invention that the decoded macro block data is viewed/observed in the pixel domain, rather than inspecting the various decoded parameters for the macro-block like motion vectors, DC texture AC texture values, coded block patterns. Such an approach takes care of possibility of decoding errors in any of those parameters. This aspect of the invention calculates the continuity of the macro-block pixel data with adjacent macro-block pixel data and compares the continuity difference with a dynamic threshold based on quantization parameters of the macro-block. This methodology satisfies the need for a dynamically adaptive threshold to take into account variations in streams characteristics. These streams characteristics are based on various factors like bit rate, frame rate, visual movements in scene, camera capture conditions, visual contents and the like.

Figure 1:
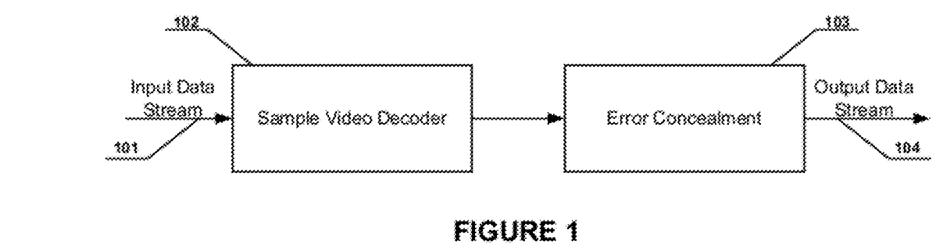
FIG. 1 illustrates prior art with video decoding system utilizing error concealment means to improve the visual quality of decoded video frame data.

FIG. 1 illustrates video decoding system in the prior art for utilizing error concealment means to improve the visual quality of decoded video frame data. The encoded video bitstream [101] is passed to a sample video decoder block [102], which decodes the video bitstream to produce video frames. These video frames having possibly few macro-blocks as LOST is fed at video frame by frame to error concealment block [103] which provides means of concealing the erroneous macro-block data to generate error concealed video frames as output [104].

Figure 2:
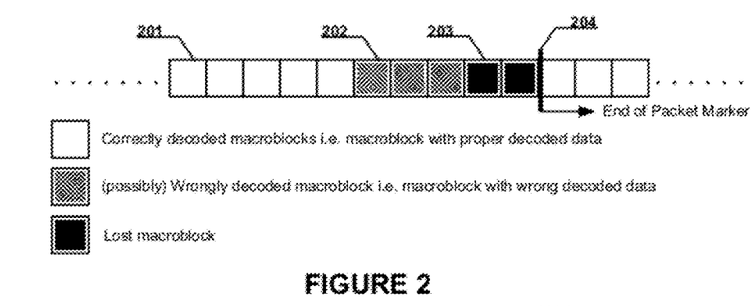
FIG. 2 illustrates general case of presence of wrongly decoded and lost macro-blocks in video packet.

FIG. 2 illustrates a scenario where macro-block data decoded in sequential order is shown. Because of the possibility of a decoder detecting the errors in stream fashion way ahead after actual presence of error in the stream, there lies possibility of 'wrongly decoded' macro-block data [202] in between the correctly decoder macro-block data [201] and LOST macro-block data [203]. As seen the normal decoding macro-block data continues after locating a unique bit pattern of packet marker [204], which marks start of new video packet.

Figure 2A:
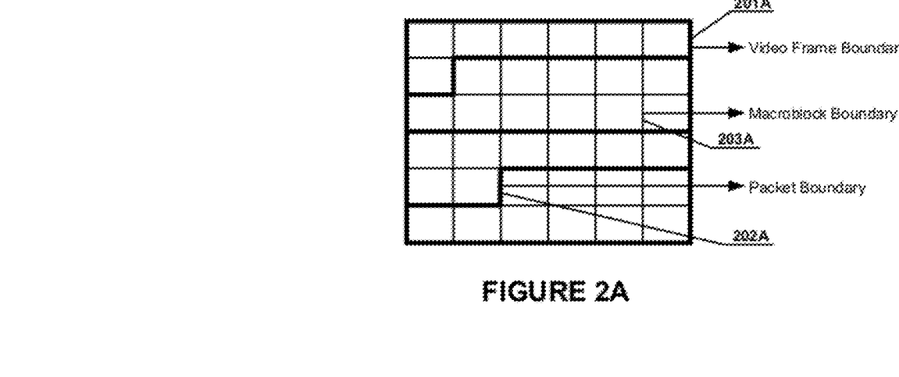
FIG. 2A shows the organization of macro-blocks and packets in a video frame.

FIG. 2.A shows the organization of number of macro-blocks [203A] in a video packets. Number of Video Packets [202A] form one video Frame [201A]. A new macro-block starts with a new packet. A new packet starts with a new video frame.

Figure 3:
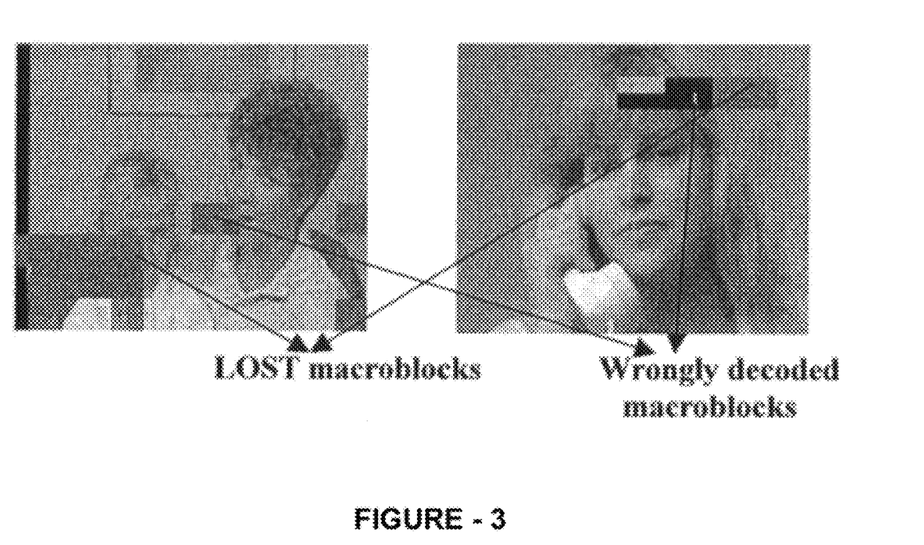
FIG. 3 shows visual representation of Lost and wrongly decoded macro-block data.

FIG. 3 shows a visual representation of Lost and wrongly decoded macro-block data. As seen, the 'wrongly decoded' macro-block data is characterized by discontinuity at the macro-block boundaries.

Figure 4:
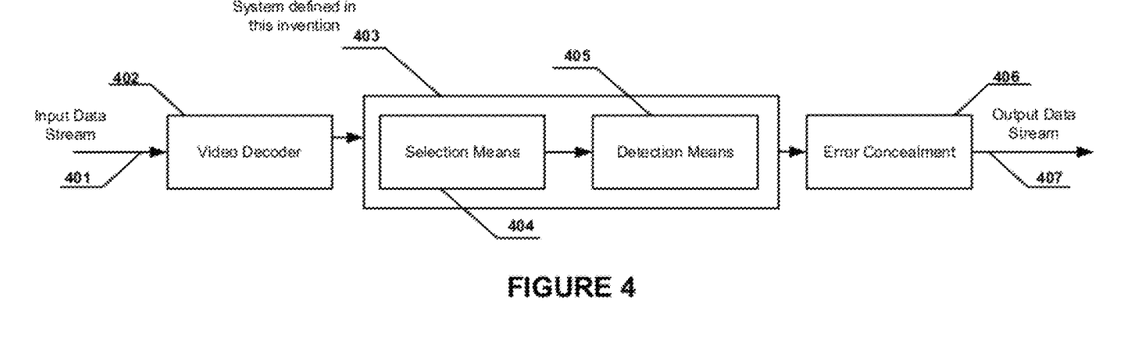
FIG. 4 illustrates a video decoding system, where as per one embodiment of invention, selection and detection means are utilized before error concealment.

FIG. 4 illustrates a video decoding system, where as per one embodiment of the invention, selection and detection means are utilized before error concealment. The input binary data stream [401] is feed to a video decoder block [402], which generates decoded video frames as output. These video frames are passed as input to the error selection and detection block [403] frame by frame. The error detection block consists of 'selection means' block [404] and 'detection means' block [405]. The 'selection means' pick appropriate macro-block numbers on which the 'detection means' are applied. The macro-block number selected by the 'selection means' is fed to the 'detection means'. The 'detection means' apply a pixel level continuity check on the macro-block. The threshold used for comparison in continuity check is calculated dynamically based on the quantization parameter of the given macro-block. The macro-blocks identified as LOST by continuity check in 'detection means' are fed to error concealment block [406]. This error concealment means could be any embodiment from related artwork. As a one embodiment, means specified in Sofia Tsekeridou and Ioannis Pitas, "MPEG-2 Error Concealment Based on Block-Matching Principles", IEEE Trans. On Circuits and Systems for Video Technology, vol. 10, No. 4 June 2004 could be used.

Figure 5:
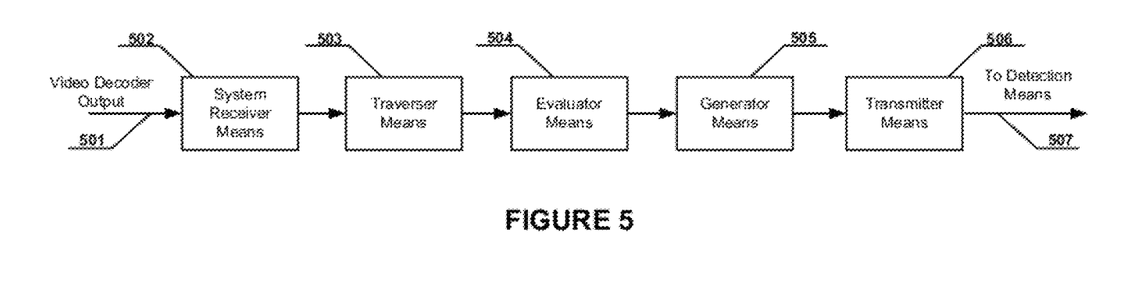
FIG. 5 illustrates the overall system for selection means.

FIG. 5 illustrates the complete system for 'selection means' [i.e. block 404 in FIG. 4]. The system receiver means block [502] receives decoded frame data [501] from the video decoder in the form of macro-blocks. A traverser means block [503] traverses the received macro-blocks in reverse zig-zag order in which the last macro-block of the frame is considered first for evaluation followed by previous macro-blocks in right to left and bottom to top order. This simplifies the process of evaluation performed by an evaluator means block [504]. In this block each macro-block is checked whether it is the last macro-block of the packet or the macro-block precedes any LOST macro-block for certain fixed number of macro-blocks. Using the evaluator means, the generator means block [505] marks the corresponding macro-block to be suspicious and sends the macro-block information [507] to the 'detection means' via transmitter means block [506].

Figure 6:
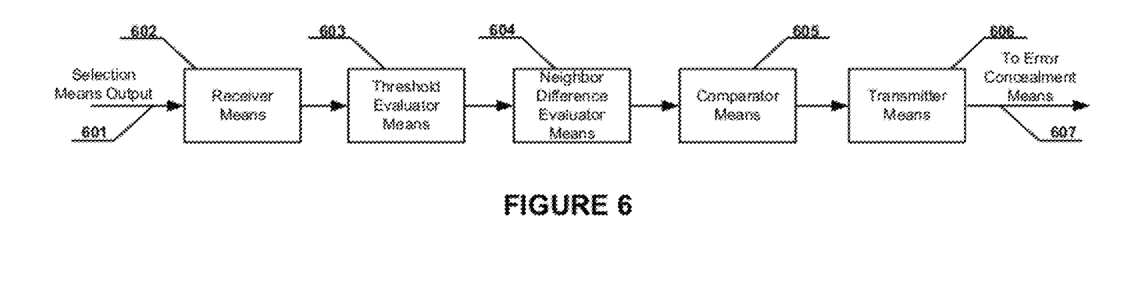
FIG. 6 illustrates the overall system for detection means.

FIG. 6 illustrates the complete system for 'detection means'. The receiver means block [602] receives the list of suspicious macro-blocks [601] from 'selection means'. Threshold evaluator means block [603] evaluates the threshold of the quantization value of the received macro-block with the desired set value. Neighbor difference evaluator means block [604] compares the difference in edge pixel values of the decoded neighboring macro-blocks in a predefined order and evaluates continuity estimate value (as detailed in FIG. 8). The comparator means block [605] compares the threshold of block [603] with the continuity estimate of block [604] and marks the received macro-block as LOST or properly decoded macro-block.

The transmitter means block [606] transmits the list of LOST macro-block [607] to the error concealment means.

Figure 7:
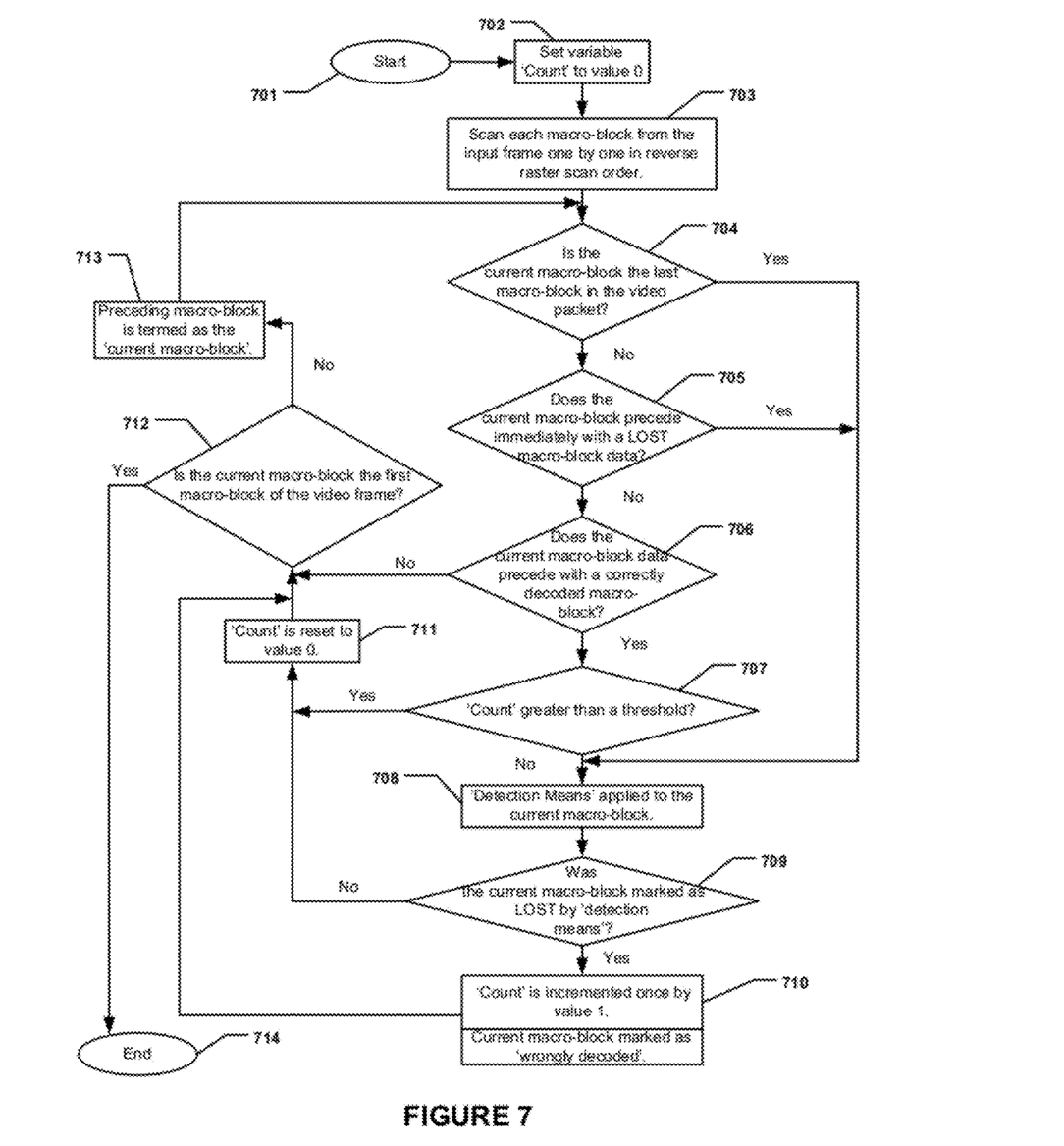
FIG. 7 illustrates flow diagram of process of selection means.
Figure 8:
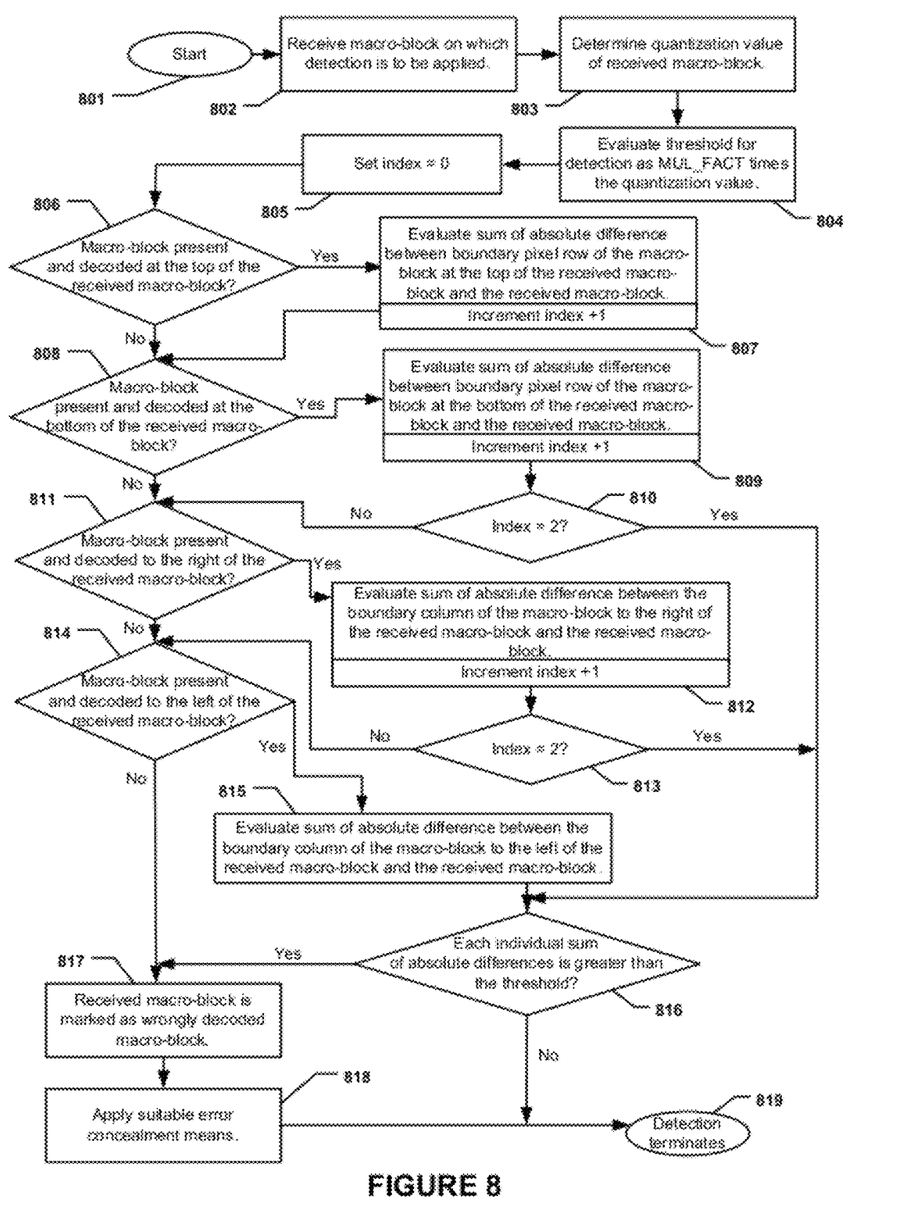
FIG. 8 illustrates flow diagram of process of detection means.

FIG. 7 shows a flowchart for one embodiment of the 'selection means' in accordance with this invention. The flow starts with start block [701]. The block [702] sets the variable 'Count' to value 0. This variable is used in subsequent flow. The block [703] scans each macro-block from the input frame one by one in reverse raster scan order. The flow goes to next step as soon as address of one macro-block is available. This address is passed as a 'current macro-block' address to the next block. The control block [704] checks for the location of the current macro-block with respect to the video packet boundaries. In case the current macro-block is the last macro-block in the video packet the flow continues with block [708], otherwise the flow goes to block [705]. In the block [705] the flow is diverted to block [708] if the current macro-block precedes immediately with a LOST macro-block data, otherwise the flow continues with block [706]. Further in the block [706] a check is done to ensure that the current macro-block data precedes with a correctly decoded macro-block, in such a case flow passes to block [707], otherwise flow passes to block [712]. In block [707] the variable 'Count' is compared with a threshold named for example, COUNTMAX. If variable 'Count' is greater than COUNTMAX the flow continues with block [711], otherwise flow continues to block [708] where 'detection means' are applied to the current macro-block. The internal flowchart associated with this block [708] is shown in FIG. 8, and explained in detail herein below. Once the 'detection means' is applied to a current macro-block, the block [709] checks if the current macro-block was marked as LOST by the 'detection means'. In that case flow continues with block [710], otherwise flow passes to block [711]. In block [710] the variable 'Count' is incremented once by value 1. Also the current macro-block is marked as 'wrongly decoded'. Subsequently the flow continues with block [712]. In block [711] the variable 'Count' is reset to value 0 and flow continues with block [712]. In the block [712] processing of complete frame is checked by comparing the address of current macro-block data with the address of the first macro-block data of the video frame. If current macro-block is the first macro-block of the video frame the flow passes to block [714], which marks the end of the flowchart for the 'selection means'. In case more macro-blocks are left for inspection, the flow continues with block [713] where focus is shifted to the macro-block preceding the current macro-block in reverse raster scan order. This preceding macro-block is termed as the 'current macro-block' and flow continues with the block [704].

FIG. 8 depicts the flowchart for one embodiment of the 'detection means' in accordance with this invention. The flow starts with start block [801]. The block [802] receives the macro-block on which detection is to be applied using the 'selection means' described in FIG. 7. In the next step the Quantization value of the received macro-block is determined in block [803]. Threshold for detection is evaluated as MUL_FACT times the Quantization value in block [804]. MUL_FACT for evaluating the said threshold of block [804] is fixed to 3. Block [805] sets the index for considering the neighboring macro-blocks for applying the 'detection means' to the said macro-block of block [802] to 0. After initialization of the index, block [806] checks whether a macro-block is present and decoded at the top of the said macro-block of block [802]. If the check performed by block [806] results in the presence of the said top macro-block, block [807] performs sum of absolute difference between the boundary pixel row of the said top macro-block of block [806] and said macro-block of block [802] and the index count is incremented by 1. Otherwise flow goes to block [808] where check is performed for the presence of a decoded macro-block at the bottom of the said macro-block of block [802]. If the check performed by block [808] results in the presence of the said bottom macro-block, block [809] performs a sum of absolute difference between the boundary pixel row of the said bottom macro-block of block [808] and said macro-block of block [802] and the index count is incremented by 1. The flow goes from block [809] to block [810] to check whether index count value is equal to 2 or not indicating whether two neighboring macro-blocks for application of 'detection means' have been obtained. If the index count value has equaled 2, then the flow goes to block [816]. Otherwise if index count is not 2 or if the check performed by block [808] results in a failure, flow proceeds to block [811]. In block [811], a check is performed to detect the presence of decoded macro-block to the right of the said macro-block of block [802]. Presence of the said macro-block of block [811] at the right results in the evaluation of the sum of absolute difference between the boundary column of the said right macro-block of block [811] and the said macro-block of block [802] along with increasing the index count by 1 by block [812]. In the next step block [813] finds whether index count is 2 or not. If index count has reached a value of 2 the flow reaches block [816]. Otherwise failure of said checking performed by block [813] and block [811] results in checking of the presence of a decoded macro-block to the left of the said macro-block of block [802] by block [814]. If the check is successful, evaluation of sum of absolute difference between the boundary columns of the said left macro-block of block [811] and said macro-block of block [802] is performed by block [815]. From here control is passed to block [816]. Failure of the check performed by block [814] transfers the control to block [817]. Alternatively, if each individual sum of absolute differences as set in block [807], block [809], block [812] and block [815] are greater than the said threshold of block [804], the control also passes to block [817] where the said macro-block of block [802] is marked as a wrongly decoded macro-block. Otherwise the said macro-block of block [802] is considered as a properly decoded macro-block and the 'detection means' terminates at block [819]. For wrongly decoded macro-blocks suitable error concealment means are applied by block [818] and after that 'detection means' terminates at block [819]. The sequence of checks performed by blocks [806], block [808], block [811] and block [814] are designed keeping in mind that the probability of getting properly decoded macro-blocks are higher for top and bottom neighboring macro-blocks as compared to right or left macro-blocks because their chances that they are present in different packets from the said macro-block of block [802] are more.

The invention claimed is:

1. A method, comprising:
decoding macro-block data for detection of wrongly decoded macro-blocks within the macro-block data, utilizing a video decoding system; and
determining a plurality of macro-blocks from the macro-block data as suspicious of being wrongly decoded but for which it is unknown whether the macro-blocks are wrongly decoded by:
traversing the macro-block data in reverse zig zag order,
upon traversal of a macro-block of the macro-block data, evaluating the traversed macro-block relative to a location of the traversed macro-block with respect to its packet boundary and a location of another macro-block determined to be suspicious of being wrongly decoded, and
identifying the traversed macro-block as suspicious, based on the evaluation;
wherein the determining the plurality of macro-blocks from the macro-block data as suspicious includes keeping track of a count of consecutive macro-blocks being identified as suspicious and terminating the determining when the count reaches three.

2. The method as claimed in claim 1, further comprising detecting at least one of the plurality of macro-blocks determined as suspicious of being wrongly decoded as being a macro-block with false coding.

3. The method as claimed in claim 2, further comprising concealing the detected at least one macro-block and generating at least one error concealed video frame.

4. The method as claimed in claim 2, wherein the detecting includes:
evaluating a threshold parameter based on a quantization value of a selected macro-block from the plurality of macro-blocks determined as suspicious of being wrongly decoded;
searching neighboring valid macro-blocks in a vertical adjacent location followed by a horizontal adjacent location;
finding a continuity measure by taking into consideration at least two macro-block boundaries by taking a sum of an absolute difference in pixel data for the selected suspicious macro-block and the adjacent macro-blocks;
comparing respective pixel data on the boundaries; and deciding to mark the selected suspicious macro-block as LOST by comparing the continuity measure with a dynamic threshold.

5. The method as claimed in claim 4, in which the threshold parameter varies dynamically based on the quantization value of the selected suspicious macro-block.

6. The method as claimed in claim 1, wherein the traversed macro-block is identified as suspicious in response to a result of the evaluation indicating that the traversed macro-block is at an end of a packet in a current frame.

7. The method as claimed in claim 1, wherein the traversed macro-block is identified as suspicious in response to a result of the evaluation indicating that the traversed macro-block is adjacent to another macro-block identified as suspicious of being wrongly decoded.

8. The method as claimed in claim 1, wherein the traversed macro-block is identified as suspicious in response to a result of the evaluation indicating that the macro-block precedes a LOST macro-block within a fixed number of macro-blocks of the macro-block data.

9. The method as claimed in claim 1, further including transmitting a list of the plurality of macro-blocks determined as suspicious of being wrongly decoded, marking at least one of the plurality of macro-blocks in the list as LOST based on a comparison of a continuity measure with a dynamic threshold, and transmitting the list with the at least one marked LOST macro-blocks for performing error concealment on the at least one marked LOST macro-blocks in the list.

10. An apparatus, comprising:
an error selection and detection block coupled to a decoder for:
receiving decoded macro-block data for detection of wrongly decoded macro-blocks within the macro-block data; and
determining a plurality of macro-blocks from the macro-block data as suspicious of being wrongly decoded but for which it is unknown whether the macro-blocks in the selected set are wrongly decoded by:
traversing the macro-block data in reverse zig zag order,
upon traversal of a macro-block of the macro-block data, evaluating the traversed macro-block relative to a location of the traversed macro-block with respect to its packet boundary and a location of another macro-block determined to be suspicious of being wrongly decoded, and
identifying the traversed macro-block as suspicious, based on the evaluation;
wherein the determining the plurality of macro-blocks from the macro-block data as suspicious includes keeping track of a count of consecutive macro-blocks being identified as suspicious and terminating the determining when the count reaches three.

11. The apparatus as claimed in claim 10, wherein the error selection and detection block further generates a refined set of suspicious macro-blocks.

12. The apparatus as claimed in claim 10, wherein the error selection and detection block further evaluates threshold parameters of the plurality of macro-blocks determined as suspicious of being wrongly decoded based on a quantization value.

13. The apparatus as claimed in claim 10, wherein the error selection and detection block further searches neighboring valid macro-block data, finds a continuity measure by taking a difference in pixel data for a selected macro-block from the plurality of macro-blocks determined as suspicious and adjacent macro-blocks, and decides that the selected suspicious macro-block is LOST by comparing the continuity measure with a dynamic threshold.

* * * * *